United States Patent [19]

Yasui

[11] Patent Number: 5,022,662

[45] Date of Patent: Jun. 11, 1991

[54] GASKET WITH A FLUID HOLE REGULATION DEVICE

[75] Inventor: Hisashi Yasui, Tokyo, Japan

[73] Assignee: Ishikawa Gaset Co., Ltd., Tokyo, Japan

[21] Appl. No.: 561,987

[22] Filed: Aug. 1, 1990

Related U.S. Application Data

[63] Continuation-in-part of Ser. No. 340,653, Apr. 20, 1989.

[30] Foreign Application Priority Data

Apr. 20, 1988 [JP] Japan ................... 63-53124

[51] Int. Cl.⁵ ............................... F16J 15/08
[52] U.S. Cl. .................... 277/235 B; 277/DIG. 6
[58] Field of Search ............. 123/41.08, 41.79, 41.02, 123/41.28; 220/201; 236/93 R, 101 E, 1 G; 277/26, 235 B, DIG. 6

[56] References Cited

U.S. PATENT DOCUMENTS

| | | | |
|---|---|---|---|
| 2,188,876 | 1/1940 | Fahlman | 123/41.28 |
| 4,653,761 | 3/1987 | Baugh et al. | 277/235 B X |
| 4,683,844 | 8/1987 | Arai et al. | 277/235 B X |
| 4,714,260 | 12/1987 | Udagawa | 277/235 B |
| 4,783,271 | 11/1988 | Silverwater | 210/168 X |

FOREIGN PATENT DOCUMENTS

| | | | |
|---|---|---|---|
| 355208 | 1/1922 | Fed. Rep. of Germany | 236/93 R |
| 510960 | 10/1930 | Fed. Rep. of Germany | 123/41.02 |
| 575607 | 2/1946 | United Kingdom | 236/93 R |
| 1076494 | 7/1967 | United Kingdom | 220/201 |

Primary Examiner—William A. Cuchlinski, Jr.
Assistant Examiner—Scott Cummings
Attorney, Agent, or Firm—Kanesaka and Takeuchi

[57] ABSTRACT

A gasket of the invention is installed in an internal combustion engine with at least one fluid hole. The gasket comprises a main body adapted to be installed in the engine and having at least one first hole communicating with the fluid hole of the engine, and a fluid hole regulation device installed in the first hole of the main body. The fluid hole regulation device includes a second hole, and at least one plate made of a shape memory alloy. The plate moves to enlarge the size of the second hole when the water temperature exceeds a predetermined value, and to reduce the size of the second hole when the water temperature drops under a predetermined value.

4 Claims, 1 Drawing Sheet

GASKET WITH A FLUID HOLE REGULATION DEVICE

CROSS REFERENCE TO RELATED APPLICATION

This is a continuation in part application of Ser. No. 340,653 filed on Apr. 20, 1989.

BACKGROUND OF THE INVENTION AND RELATED STATEMENT

The present invention relates to a gasket with a fluid hole regulation device for controlling an amount of fluid flowing through an engine based on a temperature of the engine.

In an internal combustion engine, the engine is cooled by air or water to properly operate the engine. In an engine cooled by water, when the engine is started, the temperature of the engine is low. Therefore, it is preferable that an amount of water circulating through the engine is minimum. On the other hand, since the temperature of the engine raises as the engine operates, it is required to cool the engine by circulating water as much as possible.

Also, in a winter season, temperature of an engine does not raise so high while the engine is operating. Therefore, an amount of water circulating through the engine need not be great.

Namely, it is preferable to control the temperature of the engine based on the predetermined temperature of the engine. In other words, an engine is preferably cooled only when the temperature of the engine raises beyond a predetermined temperature. As a result, the engine can efficiently operate.

In a conventional engine, a temperature sensing device and flow controlling device are equipped with an engine to measure the temperature of water flowing through the engine and to control an amount of water flowing through the engine. This convention system operates fairly well. However, it requires two devices, i.e. temperature sensing device and flow controlling device. Therefore, a simple device instead of the temperature sensing device and flow controlling device has been requested.

Accordingly, one object of the invention is to provide a gasket with a fluid hole regulation device for controlling an amount of water flowing through an engine based on the temperature of water circulating through the engine.

Another object of the invention is to provide a gasket as stated above, wherein the fluid hole regulation device is simple and can be attached to a desired gasket.

A further object of the invention is to provide a gasket as stated above, wherein the fluid hole regulation device is installed inside the engine to thereby make the engine compact.

Further objects and advantages of the invention will be apparent from the following description of the invention.

SUMMARY OF THE INVENTION

In accordance with the present invention, a gasket is installed in an internal combustion engine with at least one fluid hole, i.e. water hole. The gasket comprises a main body adapted to be installed in the engine and having at least one first hole communicating with the fluid hole of the engine, and a fluid hole regulation device installed in the first hole of the main body. The fluid hole regulation device includes a second hole, and at least one plate arranged so that a size of the second hole changes according to a temperature of water passing through the engine.

The plate is made of a shape memory alloy, and bends to enlarge the size of the second hole when the temperature of water circulating through the engine increases beyond a predetermined temperature. As a result, only when the temperature of water circulating through the engine increases beyond the predetermined temperature, the size of the fluid hole regulation device enlarges to allow large amount of water to pass therethrough. The temperature of the engine, therefore, decreases.

The plate of the fluid hole regulation device may be formed of one shape memory alloy having first and second characteristics. The plate operates to enlarge the second hole by means of the first characteristic of the plate when the temperature of water circulating through the engine increases beyond the predetermined temperature. The plate operates to reduce the second hole to the first position by means of the second characteristic of the plate when the temperature of water circulating through the engine decreases beyond the predetermined temperature.

The fluid hole regulation device may be provided with a plurality of plates to regulate the size of the second hole. Also, the shape memory alloy may only be used at a portion of the plate where the plate bends.

DETAILED DESCRIPTION OF PREFERRED EMBODIMENTS

Figure 1:
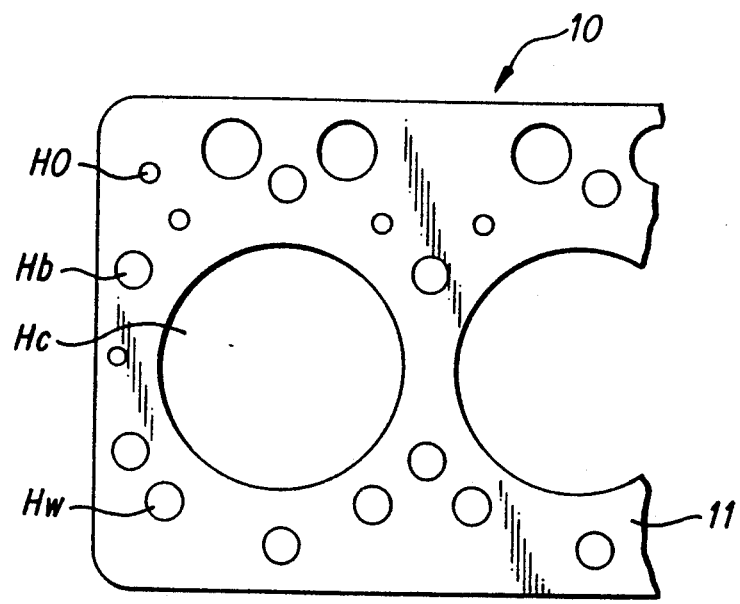
FIG. 1 is a plan view of a part of a gasket of the present invention.

Referring to FIG. 1, a gasket 10 of the present invention is shown. The gasket 10 is a cylinder head gasket and is provided with a plurality of cylinder holes Hc, water holes Hw, oil holes Ho and bolt holes Hb, as in the conventional gasket.

In the gasket 10, the areas around the cylinder holes Hc and oil holes Ho are sealed by suitable mechanism. Since the sealing mechanism around the cylinder holes Hc and oil holes Ho is not the subject matter of the present invention, the sealing mechanism is not explained. Any suitable sealing mechanism may be employed.

Figure 2:
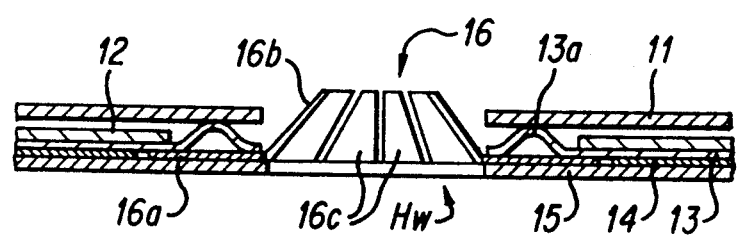
FIG. 2 is an enlarged explanatory section view of a part of a gasket with a fluid hole regulation device for showing a fluid hole reduced condition.
Figure 3:
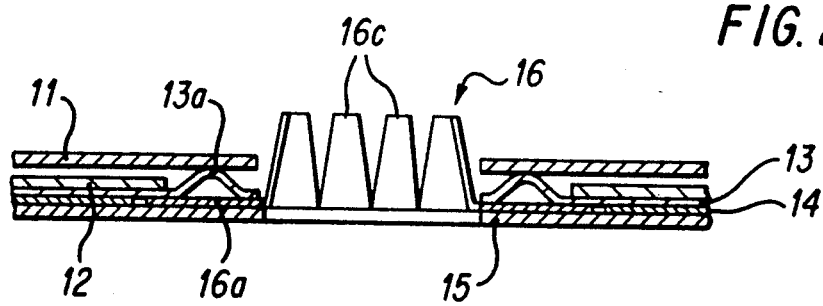
FIG. 3 is an explanatory section view of a part of the gasket for showing a fluid hole enlarged condition.
Figure 4:
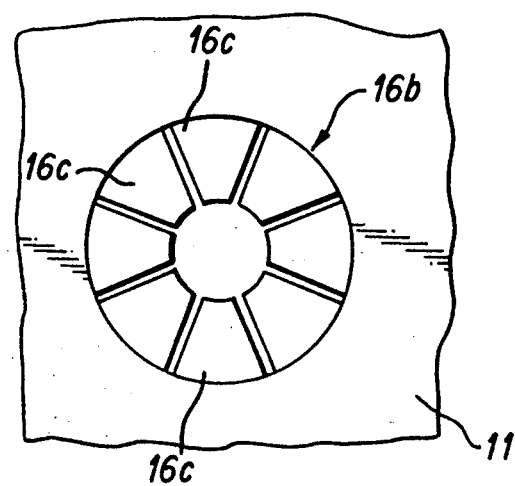
FIG. 4 is an explanatory plan view of a gasket as shown in FIG. 2.

As shown in FIGS. 2-4, the gasket 10 is a steel laminate gasket, and comprises an upper plate 11, three middle plates 12, 13, 14 and a lower plate 15. The middle plate 12 operates as a pressure regulation plate for a bead 13a of the middle plate 13. The middle plate 14 has a large hole around the fluid hole Hw, in which a fluid hole regulation device 16 is installed.

The fluid hole regulation device 16 comprises an outer portion 16a, and an inner portion 16b located inside the outer portion 16a. The outer portion 16a has a flat annular shape and is situated between the middle plate 13 and the lower plate 15 inside the middle plate 14.

The inner portion 16b of the fluid hole regulation device 16 is situated in the water hole Hw, and is divided into eight strips 16c in the shape of trapezoid. The strips 16c are integrally connected to the outer portion 16a.

The fluid hole regulation device 16 is formed of a shape memory alloy, which is already known in the art. The shape memory alloy of the fluid hole regulation device 16 has two characteristics. Namely, one characteristic is to bend the strips 16c as shown in FIG. 3 when the water temperature raises to a predetermined value, and the other characteristic is to return the strips 16c as shown in FIG. 2 when the water temperature lowers down to a predetermined value.

A shape memory alloy is defined such that a material deformed below a predetermined temperature returns to an original shape before deformation when increasing temperature. In practice, after metal main phase at high temperature is cooled and is changed to Martensite phase, a metal is deformed and shaped. When the metal is heated again, the metal changes to the main phase and returns to the former shape. Generally, even if this metal is cooled once again, the metal does not return to the shape formed at low temperature. Namely, the metal has one direction characteristic.

At this time, if strain is formed inside the metal by, for example, forming or separating small particles, the metal also memorizes a shape at a low temperature. Namely, the metal has two direction characteristics. As a result, it is possible to repeatedly change the alloy into two shapes by heating and cooling the alloy.

It has been known that Ti-Ni type alloy and Cu type alloy have these characteristics, but recently Fe type alloy has been developed. General characteristics of Ti-Ni type and Fe type alloys are shown in Table 1 below;

TABLE 1

| Characteristics | Fe—Mn—Si type | Ni—Ti type |
|---|---|---|
| Ms point (°C.) | Room temp. | Af point 10–100 |
| As point (°C.) | 125– | Af point 10–100 |
| Hysteresis (°C.) | about 100 | 0–30 |
| Shape recovery strain(%) | 3.5 | 2.0–7.0 |
| Shape recovery force(kg/mm$^2$) | 30 | 60 |
| Density(g/cm$^3$) | 7.2 | 6.4–6.5 |
| Melting point(°C.) | 1,320–1,350 | 1,240–1,310 |
| Heat expansion rate($10^{-6}$/°C.) | 15(Ms)–18(As) | 10 |
| Tension strength(Kg/mm$^2$) | 80–90 | 70–110 |
| Yield strength(Kg/mm$^2$) | 35–45 | 5–20 (Ms) 10–60(As) |
| Expansion(%) | 12–15 | 20–60 |
| Hardness(HV) | 220–250 | over 180 |
| Shape memory characteristic | one direction | one and two directions |

Further, other characteristics are shown below:
1. Shape recovery: In Ti-Ni type alloy, if it is not repeated too much, strain at 6% is completely returned.
2. Recovery force: In Ti-Ni type alloy, maximum 60 Kg/mm$^2$ (generally 30 Kg/mm$^2$). In Fe type alloy, 30 Kg/mm$^2$.
3. Phase change temperature: Exactly changed at the phase change temperature (variable by composition).
4. Fatigue life: Especially, Ti type alloy is few deterioration by repetition. It is possible to repeat for $10^5$ at 2% strain, and $10^7$ at 0.5%. Fe type and Cu type alloys are about half of the above.

[INDUSTRIAL MATERIAL (page 34) published in Japan on Aug. 1988].

In the present invention, any kind of shape memory alloy may be used as long as the strips 16c open and close at predetermined temperatures. Namely, the fluid hole regulation device 16 is designed so that the strips 16c bend from a position as shown in FIG. 2 to a position as shown in FIG. 3 when the temperature of water flowing through the water hole Hw raises to a predetermined temperature, such as 80° C., and the strips 16c return to the position as shown in FIG. 2 when the temperature of water lowers to a predetermined temperature, such as 60° C.

When an engine is started, the temperature of water in the engine is low, so that the fluid hole regulation device 16 is positioned as shown in FIG. 2. As a result, water flowing through the water hole Hw is restricted, whereby an engine is easily heated to a desired temperature.

When the engine is heated to a designed temperature, it is necessary to cool the engine. In this case, the strips 16c of the fluid hole regulation device 16 open as shown in FIG. 3 to allow large amount of water to flow through the engine. As a result, the engine is cooled properly by water circulating through the engine.

In the above embodiment, the fluid hole regulation device 16 is entirely formed of a shape memory alloy. However, bending portions of the fluid hole regulation device 16 may only be formed of the shape memory alloy. In this case, the bending portions may be connected to other portions by welding or glue.

In accordance with the present invention, the fluid hole regulation device is assembled with the gasket, and directly control flow rate of water flowing through the engine based on the temperature of water of the engine. Accordingly, the temperature of the engine can be maintained at a desired condition.

While the invention has been explained with reference to the specific embodiment of the invention, the explanation is illustrative and the invention is limited only by the appended claims.

What is claimed is:

1. A gasket for an internal combustion engine with at least one fluid hole, comprising:
   a main body adapted to be installed in the engine and having at least one first hole communicating with the fluid hole of the engine; and
   a fluid hole regulation device installed in the first hole of the main body, said fluid hole regulation device including a second hole, and a plurality of strips arranged so that a size of the second hole changes according to a temperature of the engine, at least a bending rotation of each strip being made of a shape memory alloy so that each strip bends to enlarge the size of the second hole when the temperature of water circulating through the engine increases beyond a predetermined temperature and to return to a first position when the temperature of water circulating through the engine decreases beyond a predetermined temperature.

2. A gasket according to claim 1, wherein each strip is shaped in the form of trapezoid having upper, lower and two side portions, said two side portions of the strip respectively abutting against side portions of the adjacent strips when the temperature of water circulating through the engine is lower than the predetermined temperature.

3. A gasket according to claim 2, wherein said fluid hole regulation device further includes an annular portion, said strips being connected to an inside of the annular portion.

4. A gasket according to claim 1, wherein said main body comprises at least two plates, said fluid hole regulation device being situated between the two plates.

* * * * *